Aug. 25, 1953     D. A. JACOBSON     2,649,907
GAS FUELED RADIANT HEATER

Filed Oct. 6, 1950     2 Sheets-Sheet 1

Inventor
Donald A. Jacobson
By
Attorney

Aug. 25, 1953   D. A. JACOBSON   2,649,907
GAS FUELED RADIANT HEATER
Filed Oct. 6, 1950   2 Sheets-Sheet 2
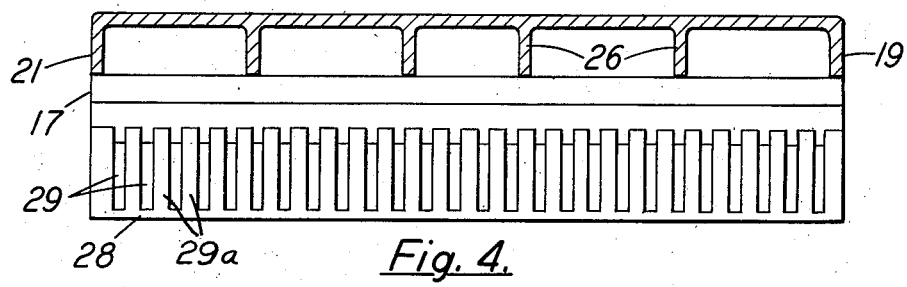
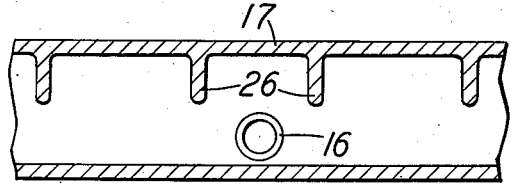
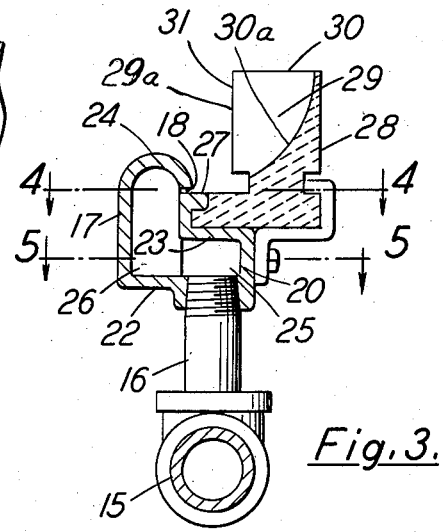
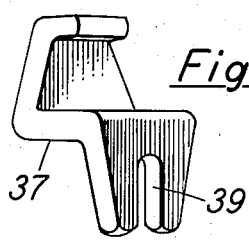
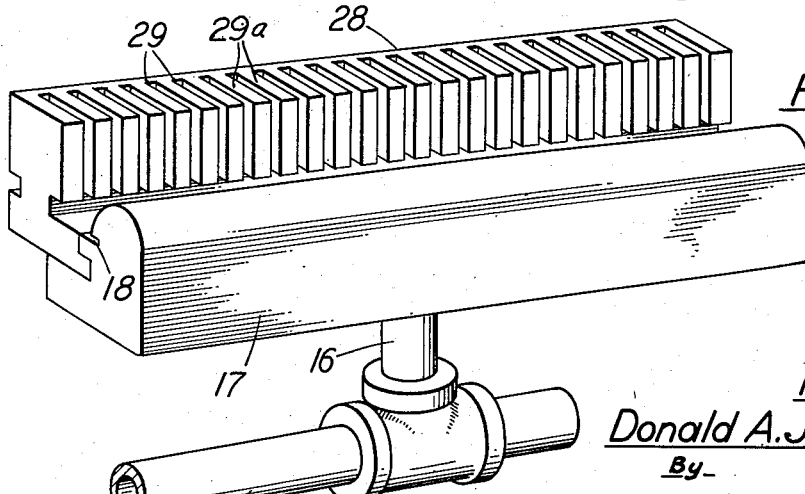
Inventor
Donald A. Jacobson
By
Attorney Patented Aug. 25, 1953

2,649,907

UNITED STATES PATENT OFFICE 2,649,907

GAS FUELED RADIANT HEATER

Donald A. Jacobson, Grand Rapids, Mich.

Application October 6, 1950, Serial No. 188,692

2 Claims. (Cl. 158—113)

The present invention provides a gas-fired generator of radiant heat energy. A gas flame is directed upon a ceramic target, to maintain it as such a temperature as to generate as much heat energy as is possible in the form of infra-red rays and radiation of similar wave length. Such devices also dissipate a considerable amount of the heat provided by the gas in the form of heated air; and in general, the measure of their value is the percentage of heat energy provided by the fuel that is realized in the form of radiant heat. These units are used in industry in drying operations, in the heat treatment of various metals, and wherever it is necessary to create an elevated temperature. It is a well known and valuable characteristic of infra-red radiation that it possesses great power of penetration rather than concentrating the heating effect upon the surface of a material, as would be the case if it were to be subjected to merely a draft of heated air.

Radiating targets maintained at elevated temperatures by gas flames (or by the use of other fuel) are well known. One widely used form of this device involves a highly porous block of ceramic material through which fuel gas is urged under pressure. Ignition takes place at the surface of the block, and the radiation from the flame back on to the ceramic material raises the temperature of the material enough to cause radiation of heat energy at the desired wave length. Another type of device involves an annular or linearly-disposed trough, with a jet of fuel gas directed downwardly along one edge of the trough. Combustion takes place during the passage of the gas across the concave surface of the trough, and the temperature of the burning gases cause the required elevation in temperature of the ceramic material to generate the radiant heat energy. It may be noted in regard to this type of device that the concave configuration of the trough has the effect of focusing the radiation so that a lack of uniformity in intensity over any substantial area results. The principal objection to both of the general types of devices known to the prior art is the relatively high percentage of available heat in the incoming fuel gas that is wasted in the heating of the surrounding air, with the consequent reduction in the percentage of heat energy that is made available in the form of radiant energy. Another objection is the difficulty that is encountered in "turning down" these units to a low fuel consumption. It is advantageous to be able to adjust a given unit for varying heating intensity as required.

The present invention provides a heating unit of the ceramic target type in which the target is formed with a series of parallel channels for the passage of the burning fuel gas. These channels are best arranged vertically and curved at the base so as to force the burning products of combustion to thoroughly scour the surface of the target to create the maximum transfer of heat. With the burning fuel thus confined within relatively narrow channels in the ceramic material, the best possible transfer of heat energy from the products of combustion to the target is achieved. As a consequence of this feature, the fuel gas is impinged upon high temperature surfaces substantially throughout the entire mass of the jet of gas in contrast to the old arrangement in which only a boundary portion of the jet impinges upon the heated surface. The latter case results in relatively gradual elevation of the temperature of the fuel to the point of ignition. Such gradual burning has a tendency to result in incomplete combustion within the area of the target where the heat can be utilized to generate radiant energy.

A fuel-distributing chamber for controlling the emission of fuel gas is provided by the present invention, and a jet of gas is established by a slot in the wall of the chamber so positioned that the jet impinges upon the lower-most portion of the channels in the ceramic target. This jet is kept extremely thin so as to permit immediate elevation of the fuel gas to the temperature required for combustion. With this arrangement, the fuel gas begins ignition at approximately the point of entry of the combustion channels, with the elevated temperature of the ceramic material hastening and completing the process of combustion within the confines of those channels. Suitable baffles are provided within the chamber to assure a uniform density and velocity of the jet of fuel along the length of the slot.

The disposition of the fuel-distributing chamber (preferably formed of metal) with respect to the heated ceramic target is such as to place a small portion of the chamber within the space defined by the normally (perpendicularly) projected area from the radiating face. This arrangement results in pre-heating the fuel gases to a point where the temperature of combustion can take place at a very short distance beyond the slot from which the fuel gases emerge. The slot is also positioned so that the chamber extends on both sides of it, so that a portion of the fuel is permitted to traverse the heated area of the chamber before emerging from the slot. The relative position of the target and the chamber is maintained by an extremely simple assembly system in which the mounting of the target is secured by a simple screw-fastened clip.

The various features of the present invention will be analyzed in detail through a discussion of the particular embodiments illustrated in the accompanying drawings. In these drawings:

Figure 2 is a perspective view showing an assembled heating unit attached to a fuel-supply conduit.

Figure 3 is a section taken through the assembled unit.

Figure 4 is a section taken on the plane 4—4 of Figure 3.

Figure 5 is a section taken on the plane 5—5 of Figure 3.

Figure 6 is a perspective view showing the attaching clip holding the target and fuel-distributing chamber in assembled relationship.

Figure 1:
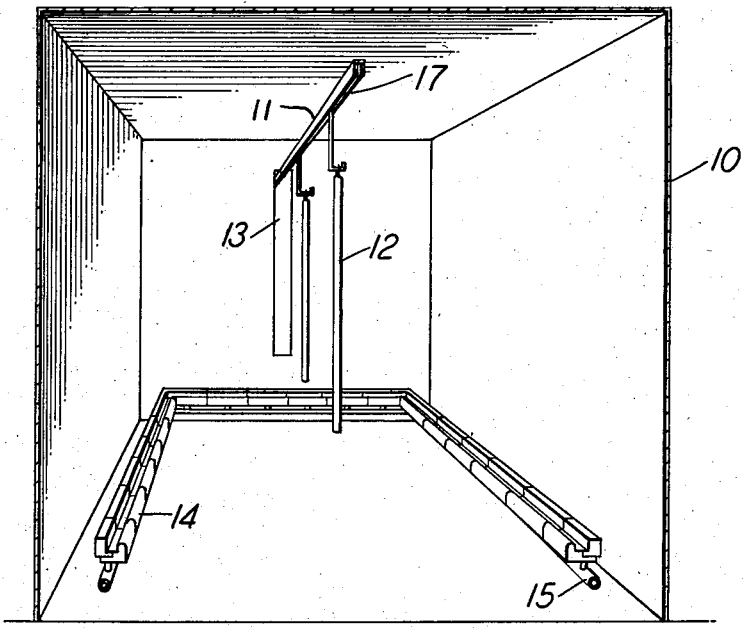
Figure 1 is a perspective view showing an installation of a series of units constructed according to the present invention in a drying oven.

Referring to Figure 1, the drying oven 10 is provided with a conveyor 11 for carrying a series of pieces such as is indicated at 12 and subjecting them to elevated temperatures in order to dry whatever coatings of paint, lacquer, or the like have been applied. The pieces are conducted by the conveyor through the oven and out through the aperture 13.

A series of heating units is indicated at 14 and is arranged around the lower portion of the oven 10. Each of these heating units is mounted upon a short length of pipe securely attached to the fuel-supply conduit 15. The direction of radiation from the heating units forming the series 14 is such that the work-pieces 12 are subjected to radiant heat during their passage down the oven 10.

Referring to Figures 2 through 6, inclusive, the series of heating units 14 is made up by the individual units as shown in Figure 2. The short vertical length of pipe 16 is associated with the main supply conduit 15 and supports the fuel-distribution chamber 17. The interior construction of this chamber is such as to create a uniform flow of gas out through the slot 18 throughout its entire length. The construction of the chamber to accomplish this may be considered to include the exterior walls 19, 20, and 21. A bottom 22, together with the upper flat surface 23 and the arcuate surface 24 complete the chamber provided by the manifold. A portion 25 extends throughout the length of the chamber, and the baffle partitions 26 provide a series of channels tending to remove any flow of gas along the length of the chamber within that portion of the unit. These baffle partitions serve to maintain an even distribution of gas along the length of the slot 18. Fuel gas entering through the supply conduit 15 passes through the short pipe 16 and enters the portion of the chamber 25. The partitions 26 guide the flow of fuel, and the fuel passes between them to the slot 18 acting as an exit orifice.

The fuel gas emerging at the slot 18 passes over a short table-like surface 27. The temperature of this surface is low enough to inhibit the "flash-back" that might take place if the surrounding temperature were elevated to the point of combustion. After the flow of gas passes beyond the surface 27, it impinges upon the ceramic target 28. At this point, the ribbon of fuel gas emerging from the long slit or slot 18 is divided into a series of channels provided by the slots 29 defined by the faces 29a projecting from the curved wall 30a of the target 28. When the stream has emerged from the surface 30, the process of combustion will have been completed. During the passage of the gases through the channels 29, the heat contained in the products of combustion will be transferred in a large degree to the target so as to raise the temperature thereof to a point where radiation of heat energy takes place from the surfaces 30 and 31. It will be noted that the upper curved surface 24 of the manifold is placed within the space defined by the normal projection of the surface 31. This feature facilitates elevating the temperature of the manifold to a point where the fuel gases are pre-heated to such a degree that combustion takes place at the desired point in transit from the slot 18 over to the target 28.

Figure 7:
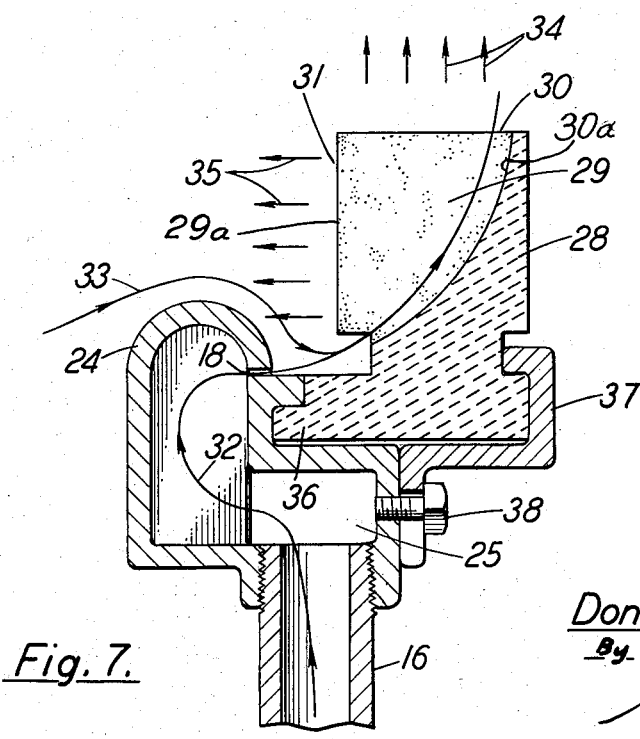
Figure 7 is a section similar to Figure 3 taken on an enlarged scale and provided for the purpose of showing the path of the gases and the directions of radiation of heat energy.

Referring to Figure 7, the paths of fuel gases and secondary air are substantially as indicated by the curved lines, with the direction of flow noted by the arrows. The fuel gas entering from the pipe 16 passes along the general line 32. This path of fuel may have a component along the chamber portion 25, and will pass through one of the channels defined by the partitions 26. The fuel in the pipe 16 is mixed with primary air in a quantity not sufficient to support complete combustion. The high velocity at which the gas emerges through the slot 18 induces a flow of secondary air along the line 33, this flow being facilitated by the curvature of the surface 24. The fuel and primary air becomes intermixed with the secondary air during transit across from the slot 18 to the target 28, and continue the process of mixture through the early stages in which the gases pass through the channels 29. Combustion preferably begins at approximately the point of juncture of the lines 33 and 32 as indicated in Figure 7.

The arrows 34 indicate the general direction of the maximum radiation of heat energy from the surface 30, and the arrows 35 from the surface 31. These surfaces are actually not continuous, and form the fronts of the partitions or fins between the channels 29.

The assembled relationship of the target 28 and the chamber is maintained by the engagement of the projection 36 on the target 28 with the corresponding recess in the metal casting forming the chamber 17 in tongue-and-groove relationship. The target 28 is held in engagement in this manner by the action of the clip 37 secured to the casting by the screw 38. The target can be removed from the assembly by the removal of the screw 38. The clip 37 is adapted to receive the screw 38 at the slot 39 provided to permit vertical adjustment to allow for manufacturing tolerances and properly positioning the target 28 with respect to the slot 18 and the table-surface 27.

The particular embodiments which have been illustrated in the accompanying drawings and discussed herein are for illustrative purposes only and are not to be considered as limitations upon the scope of the appended claims.

I claim:

1. A gas burner comprising a fuel distributing member having a peripheral wall defining an elongated passage containing an inlet port, transverse walls integral with said member defining with said peripheral wall a plurality of compartments adjacent said passage and communicating therewith, said peripheral wall being common to said compartments and containing a continuous narrow slot defining outlet ports intersecting said compartments.

2. A gas burner for generating radiant heat comprising fuel discharge means containing a delivery slit, flame target means including a member having a curved wall concavely disposed towards said slit and terminating adjacent said slit, and a plurality of parallel spaced flanges projecting from said wall and defining flame passages therebetween to receive gas from said slit, said flanges terminating in substantially a plane, whereby gas delivered from said slit enters said passages and follows a curved path and heat is radiated from said flanges at said plane.

DONALD A. JACOBSON.

References Cited in the file of this patent

UNITED STATES PATENTS

| Number | Name | Date |
|---|---|---|
| 1,704,875 | Vaughn | Mar. 12, 1929 |
| 2,410,542 | Kemp | Nov. 5, 1946 |
| 2,464,333 | McGlaughlin | Mar. 15, 1949 |
| 2,533,143 | Scarbau | Dec. 5, 1950 |

FOREIGN PATENTS

| Number | Country | Date |
|---|---|---|
| 13,595 | Great Britain | of 1915 |